US008421824B2

(12) United States Patent
Brown et al.

(10) Patent No.: US 8,421,824 B2
(45) Date of Patent: *Apr. 16, 2013

(54) HAND IMAGE FEEDBACK (75) Inventors: Douglas Stuart Brown, Charlotte, NC (US); John Falk Kelley, Woodstock, GA (US); James Robert Rudd, Charlotte, NC (US); Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,492

(22) Filed: Apr. 17, 2012

(65) Prior Publication Data

US 2012/0200602 A1 Aug. 9, 2012

Related U.S. Application Data (63) Continuation of application No. 12/236,830, filed on Sep. 24, 2008, now Pat. No. 8,228,345.

(51) Int. Cl.
*G09G 5/00* (2006.01)
(52) U.S. Cl.
USPC ........... 345/634; 345/156; 345/157; 345/158; 345/1.1; 345/1.3; 345/639
(58) Field of Classification Search .................. 345/1.1, 345/1.3, 156–158, 168, 634, 639
See application file for complete search history.

(56) References Cited

U.S. PATENT DOCUMENTS

| 5,436,639 | A | * | 7/1995 | Arai et al. ..................... 345/156 |
| 5,767,842 | A | * | 6/1998 | Korth ............................ 345/168 |
| 6,005,767 | A | * | 12/1999 | Ku et al. .................. 361/679.27 |
| 6,104,359 | A | * | 8/2000 | Endres et al. ................. 345/589 |
| 6,433,774 | B1 | * | 8/2002 | D'Hooge ...................... 345/157 |
| 6,614,422 | B1 | * | 9/2003 | Rafii et al. .................... 345/168 |

(Continued)

OTHER PUBLICATIONS

Rahul Sukthankar et al., "Automatic Keystone Correction for Camera-Assisted Presentation Interfaces", Lecture Notes in Computer Science: Advances in Multimodal Interfaces—ICMI 2000, Springer Berlin / Heidelberg, p. 607-614.*

(Continued)

*Primary Examiner* — James A Thompson
*Assistant Examiner* — Fikru Gennene
(74) *Attorney, Agent, or Firm* — Schmeiser, Olsen & Watts; Anna Linne (57) ABSTRACT

An image generation method and system. The method includes receiving by a computing apparatus from a video recording device attached to a backside of a video monitor connected to the computing apparatus, a video data stream comprising a first video image of an input device connected to the computing apparatus and a second video image of a users hands enabling switches on the input device. An input device image associated with the input device is displayed. The computing apparatus super-imposes and displays a hand image associated with the user's hands over the input device image. The computing apparatus adjusts a brightness of the hand image such that the input device image is visible through the hand image.

20 Claims, 10 Drawing Sheets

U.S. PATENT DOCUMENTS

| | | | |
|---|---|---|---|
| 6,710,770 | B2 | 3/2004 | Tomasi et al. |
| 6,903,927 | B2 | 6/2005 | Anlauff |
| 6,919,864 | B1 * | 7/2005 | Macor ............................ 345/1.1 |
| 6,972,947 | B2 | 12/2005 | Duncan |
| 7,042,442 | B1 * | 5/2006 | Kanevsky et al. ............ 345/169 |
| 7,239,505 | B2 | 7/2007 | Keely et al. |
| 7,417,681 | B2 | 8/2008 | Lieberman et al. |
| 2006/0132447 | A1 | 6/2006 | Conrad |
| 2006/0256512 | A1 * | 11/2006 | Esther Kang ................. 361/681 |
| 2007/0206349 | A1 | 9/2007 | Jacobs |
| 2007/0217131 | A1 | 9/2007 | Kehr |
| 2010/0064212 | A1 * | 3/2010 | Snyder .......................... 715/700 |
| 2010/0073404 | A1 | 3/2010 | Brown et al. |
| 2010/0156782 | A1 | 6/2010 | Kosinski, II et al. |
| 2010/0177035 | A1 * | 7/2010 | Schowengerdt et al. ..... 345/156 |

OTHER PUBLICATIONS

Office Action (Mail Date Apr. 15, 2011) for U.S. Appl. No. 12/236,830, filed Sep. 24, 2008; Confirmation No. 8669.

Amendment filed Jul. 12, 2011 in response to Office Action (Mail Date Apr. 15, 2011) for U.S. Appl. No. 12/236,830, filed Sep. 24, 2008; Confirmation No. 8669.

Final Office Action (Mail Date Nov. 2, 2011) for U.S. Appl. No. 12/236,830, filed Sep. 24, 2008; Confirmation No. 8699.

Request for Continued Examination and Amendment filed Jan. 27, 2012 in response to Final Office Action (Mail Date Nov. 2, 2011) for U.S. Appl. No. 12/236,830, filed Sep. 24, 2008; Confirmation No. 8669.

Notice of Allowance (Mail Date Mar. 16, 2012) for U.S. Appl. No. 12/236,830, filed Sep. 24, 2008; Confirmation No. 8669.

* cited by examiner

HAND IMAGE FEEDBACK

This application is a continuation application claiming priority to Ser. No. 12/236,830, filed Sep. 24, 2008.

FIELD

The present invention relates to a method and associated system for generating images of a user's hands on an input device using a video overlay.

BACKGROUND

Illustrating images typically comprises an inaccurate process with little flexibility. Accordingly, there exists a need in the art to overcome at least some of the deficiencies and limitations described herein above.

SUMMARY OF THE INVENTION

The present invention provides a method comprising: receiving, by a computing apparatus from a video recording device attached to a backside of a video monitor mechanically and electrically connected to the computing apparatus, a first video data stream, wherein the first video data stream comprises a first video image of an input device electrically connected to the computing apparatus and a second video image of a users hands enabling switches on the input device, wherein the first video image and the second video image comprise keystone adjustments to remove image distortion, wherein the video monitor is positioned over the input device such that the users hands are positioned between the backside of the video monitor and a topside of the input device, and wherein the users hands are obstructed from view by the video monitor; displaying, by the computing apparatus via the video monitor, an input device image associated with the input device, wherein the input device image illustrates various switches being enabled, wherein the input device image is displayed within a first independent portion of the video monitor, and wherein the first independent portion does not include an entire portion of the video monitor; super-imposing, by the computing apparatus, a hand image associated with the users hands over the input device image; displaying, by the computing apparatus via the first independent portion of the video monitor, the hand image associated with the users hands, wherein the hand image is displayed over the input device image, wherein the hand image is displayed directly above and over the users hands, and wherein the hand image is displayed within the first independent portion of the video monitor; adjusting, by the computing apparatus, a brightness of the hand image such that the input device image is visible through the hand image, wherein the adjusting results in the hand image being placed in a semi-transparent mode such that images of the switches of the input device image are faintly displayed through the hand image; removing, by the computing apparatus from the video monitor, the input device image such that only the users hands are visible within the first independent portion of the video monitor; enabling, by the computing apparatus, a software application associated with the input device; displaying, by the computing apparatus via a second independent portion of the video monitor, characters generated by the software application in response to the users hands enabling the switches on the input device, wherein the first independent portion differs from the second independent portion; generating, by the computing apparatus multiple highlighted portions of the hand image and a multiple highlighted portions of the input device; displaying, by the computing apparatus via the first independent portion of the video monitor, each portion of the multiple highlighted portions of the hand image and each portion of the multiple portions of the highlighted portion of the input device is being enabled; and displaying, by the computing apparatus via a clear lens comprised by the video monitor, an additional independent input device being enabled, wherein the video monitor is positioned over the additional input device such that the users hands are additionally positioned between the backside of the clear lens and a topside of the additional input device, and wherein the additional input device comprises a mouse pad being enabled.

The present invention provides a computing apparatus comprising a processor coupled to a computer-readable memory unit, the memory unit comprising instructions that when executed by the processor implements an image generation method, the method comprising: receiving, by the computing apparatus from a video recording device attached to a backside of a video monitor mechanically and electrically connected to the computing apparatus, a first video data stream, wherein the first video data stream comprises a first video image of an input device electrically connected to the computing apparatus and a second video image of a users hands enabling switches on the input device, wherein the first video image and the second video image comprise keystone adjustments to remove image distortion, wherein the video monitor is positioned over the input device such that the users hands are positioned between the backside of the video monitor and a topside of the input device, and wherein the users hands are obstructed from view by the video monitor; displaying, by the computing apparatus via the video monitor, an input device image associated with the input device, wherein the input device image illustrates various switches being enabled, wherein the input device image is displayed within a first independent portion of the video monitor, and wherein the first independent portion does not include an entire portion of the video monitor; super-imposing, by the computing apparatus, a hand image associated with the users hands over the input device image; displaying, by the computing apparatus via the first independent portion of the video monitor, the hand image associated with the users hands, wherein the hand image is displayed over the input device image, wherein the hand image is displayed directly above and over the users hands, and wherein the hand image is displayed within the first independent portion of the video monitor; adjusting, by the computing apparatus, a brightness of the hand image such that the input device image is visible through the hand image, wherein the adjusting results in the hand image being placed in a semi-transparent mode such that images of the switches of the input device image are faintly displayed through the hand image; removing, by the computing apparatus from the video monitor, the input device image such that only the users hands are visible within the first independent portion of the video monitor; enabling, by the computing apparatus, a software application associated with the input device; displaying, by the computing apparatus via a second independent portion of the video monitor, characters generated by the software application in response to the users hands enabling the switches on the input device, wherein the first independent portion differs from the second independent portion; generating, by the computing apparatus multiple highlighted portions of the hand image and a multiple highlighted portions of the input device; displaying, by the computing apparatus via the first independent portion of the video monitor, each portion of the multiple highlighted portions of the hand image and each portion of the multiple portions of the highlighted portion of the input device as each the portion of the multiple portions of the highlighted portion of the input device is being enabled; and displaying, by the computing apparatus via a clear lens comprised by the video monitor, an additional independent input device being enabled, wherein the video monitor is positioned over the additional input device such that the users hands are additionally positioned between the backside of the clear lens and a topside of the additional input device, and wherein the additional input device comprises a mouse pad being enabled.

The present invention provides a computer program product, comprising a computer readable storage medium having a computer readable program code embodied therein, the computer readable program code comprising an algorithm that when executed by a computer processor of a computing system implements an image generation method comprising: receiving, by the computing apparatus from a video recording device attached to a backside of a video monitor mechanically and electrically connected to the computing apparatus, a first video data stream, wherein the first video data stream comprises a first video image of an input device electrically connected to the computing apparatus and a second video image of a users hands enabling switches on the input device, wherein the first video image and the second video image comprise keystone adjustments to remove image distortion, wherein the video monitor is positioned over the input device such that the users hands are positioned between the backside of the video monitor and a topside of the input device, and wherein the users hands are obstructed from view by the video monitor; displaying, by the computing apparatus via the video monitor, an input device image associated with the input device, wherein the input device image illustrates various switches being enabled, wherein the input device image is displayed within a first independent portion of the video monitor, and wherein the first independent portion does not include an entire portion of the video monitor; super-imposing, by the computing apparatus, a hand image associated with the users hands over the input device image; displaying, by the computing apparatus via the first independent portion of the video monitor, the hand image associated with the users hands, wherein the hand image is displayed over the input device image, wherein the hand image is displayed directly above and over the users hands, and wherein the hand image is displayed within the first independent portion of the video monitor; adjusting, by the computing apparatus, a brightness of the hand image such that the input device image is visible through the hand image, wherein the adjusting results in the hand image being placed in a semi-transparent mode such that images of the switches of the input device image are faintly displayed through the hand image; removing, by the computing apparatus from the video monitor, the input device image such that only the users hands are visible within the first independent portion of the video monitor; enabling, by the computing apparatus, a software application associated with the input device; displaying, by the computing apparatus via a second independent portion of the video monitor, characters generated by the software application in response to the users hands enabling the switches on the input device, wherein the first independent portion differs from the second independent portion; generating, by the computing apparatus multiple highlighted portions of the hand image and a multiple highlighted portions of the input device; displaying, by the computing apparatus via the first independent portion of the video monitor, each portion of the multiple highlighted portions of the hand image and each portion of the multiple portions of the highlighted portion of the input device as each the portion of the multiple portions of the highlighted portion of the input device is being enabled; and displaying, by the computing apparatus via a clear lens comprised by the video monitor, an additional independent input device being enabled, wherein the video monitor is positioned over the additional input device such that the users hands are additionally positioned between the backside of the clear lens and a topside of the additional input device, and wherein the additional input device comprises a mouse pad being enabled.

The present invention advantageously provides a simple method and associated system capable of illustrating images.

DETAILED DESCRIPTION

Figure 1:
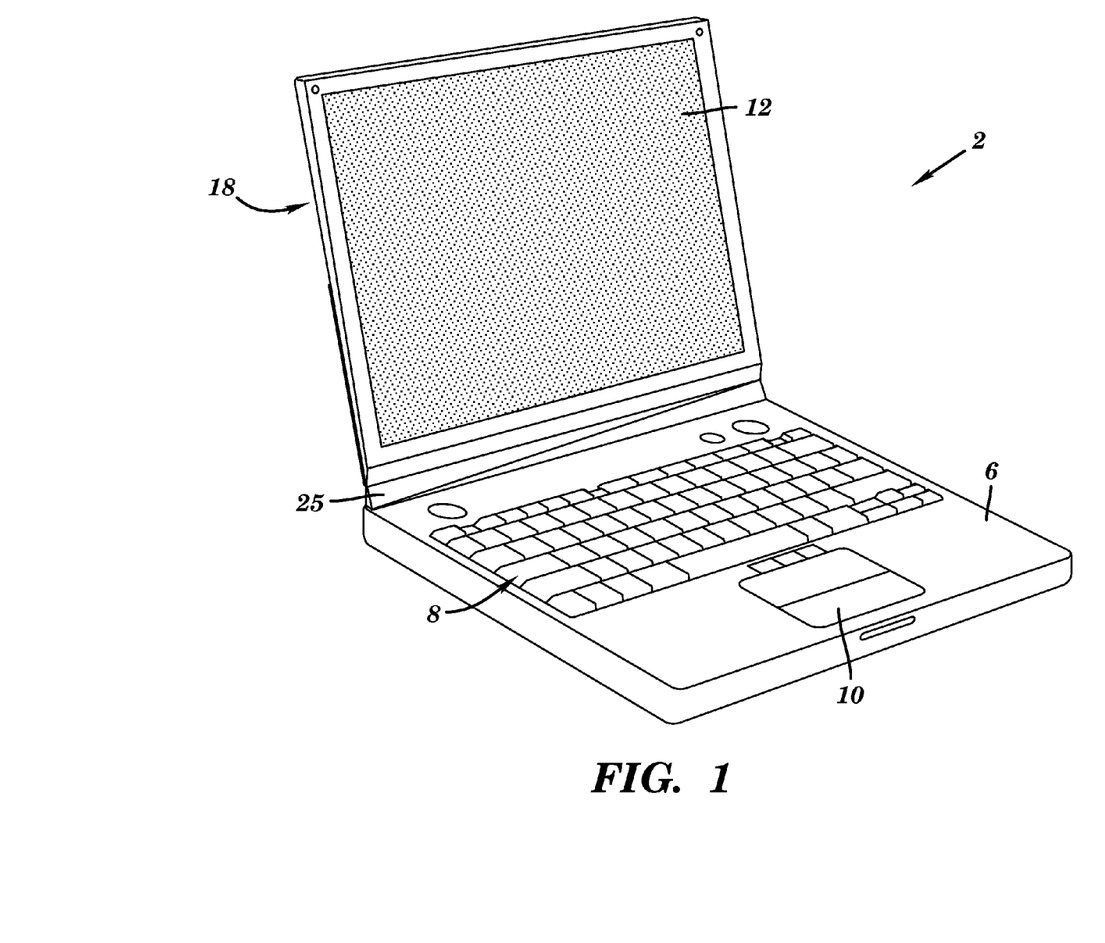
FIG. 1 illustrates a computing apparatus comprising a movable display unit and a recording device attached to the display unit, in accordance with embodiments of the present invention.
Figure 2:
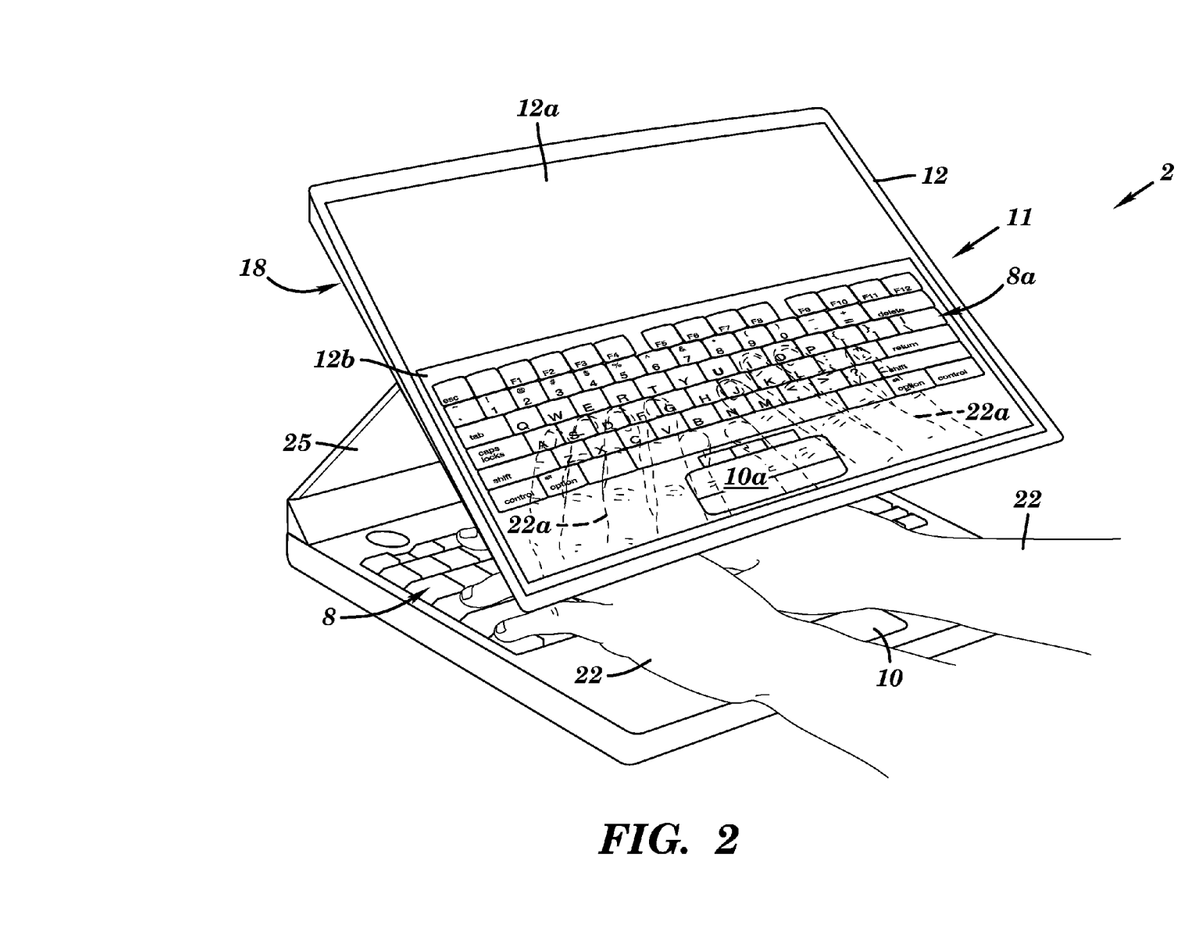
FIG. 2 illustrates an alternative view of the computing apparatus of FIG. 1, in accordance with embodiments of the present invention.

FIG. 1 illustrates a computing apparatus 2 comprising a (movable) display unit 12 and a recording device 18 attached to display unit 12, in accordance with embodiments of the present invention. Computing apparatus 2 additionally comprises input devices 8 and 10, a base assembly 6, and a hinge assembly 25. Although computing apparatus 2 in FIG. 1 is illustrated as a laptop or notebook computer comprising an integrated display unit 12 and input devices 8 and 10, note that computing apparatus 2 could comprise any type of computer including, inter alia, a computer with a separate display and separate input devices (e.g., a desktop computer), etc. Recording device 18 is attached to a back side of display unit 12 (i.e., a side opposite to a display side of display unit). Recording device 18 may comprise any type of video recording device including, inter alia, a video camera, etc. Display unit 12 may comprise any type of computer monitor including, inter alia, a liquid crystal display (LCD) monitor, a cathode ray tube (CRT) monitor, etc. Display unit 12 may comprise a single display monitor or a plurality of display monitors. Alternatively, display unit 12 may comprise a display monitor integrated with a clear lens assembly (e.g., glass, plastic, etc). Display unit 12 is configured to lift away from the base assembly 6 on hinge assembly 25. Hinge assembly 25 may comprise a cantilevered hinge assembly (e.g., as illustrated in FIG. 2) or side brackets. Hinge assembly 25 allows a user to position display unit 12 such that there is clearance is available between display unit 12 and base assembly 6 for a user to reach under display unit 12 for typing (i.e., using input device 8) and mouse control (i.e., using input device 10) on the keyboard. Although input devices 8 and 10 in FIG. 1 are illustrated respectively as a keyboard and a mouse, note that any type of input device may be used in accordance with embodiments of the present invention. For example, input devices 8 and 10 may comprise a joystick assembly, a keypad, a video game controller, etc.

FIG. 2 illustrates an alternative view of computing apparatus 2 of FIG. 1, in accordance with embodiments of the present invention. During operation of computing apparatus 2, display unit 12 may be pivoted all the way down over input devices 8 and 10 so that display unit 12 provides optimal visibility for a user. Display unit 12 may be rotated from 90 degrees to parallel with a plane of base unit 6. The various viewing angles for display 12 provide a different aspect ratio for viewing various documents or information that has an aspect ratio where the height exceeds the width. Due to the various viewing angles for display 12, a view of a user's hands 22 may become obstructed. Therefore, recording device 18 is attached to a backside of display unit 12 and may be rotated around so that it points away from the user and down towards the input devices 8 and 10 (and user's hands 22) under display unit 12. A lens on recording device 18 may be adjusted for wide-angle view (e.g., software keystone adjustments may remove apparent distortion). A video 11 comprising video image 8a of input device 8, video image 10a of input device 10, and video image 22a of user's hands activating input devices 8 and 10 may be displayed via a video window on display unit 12. Display unit 12 may display video 11 in a first portion 12b of display unit 12 (e.g., a first window) and display computer software in use (e.g., a word processing software application) in a second portion 12a of display unit 12 (e.g., a second window). The first portion 12b and second portion 12a may be displayed anywhere and in any size on display unit 12. As a first alternative (i.e., in a case where display unit 12 comprises multiple display monitors), first portion 12b may be comprised by a first display monitor of display unit 12 and second portion 12a may be comprised by a second display monitor of display unit 12. In this scenario, display unit 12 (i.e., comprising first and second individual monitors) may display video 11 in the first monitor and display computer software in use (e.g., a word processing software application) in the second monitor of display unit 12. As a second alternative (i.e., in a case where display unit 12 comprises a display monitor integrated with a clear lens assembly), first portion 12b may be comprised by the clear lens assembly and second portion 12a may be comprised by a display monitor of display unit 12. In this scenario, display unit 12 (i.e., comprising a monitor integrated with a lens assembly) allows a user to view his/her hands 22 activating input devices 8 and 10 through the clear lens assembly and display computer software in use (e.g., a word processing software application) via the monitor of display unit 12.

Computing apparatus 2 comprises a software application allowing for the following functionality associated with generating and displaying video 11:

1. The software application processes an image (i.e., of the user's hands 22 activating input devices 8 and 10) retrieved from recording device 18 in order to normalize the image to be rectangular (i.e., a keystone correction process).
2. The software application displays a base image of input devices 8 and 10 without the user's hands 22. The base image may be called up from a library of bitmaps (e.g., stored within or external to computing apparatus 2) for different laptop models. Alternatively, the base image may be constructed during a software setup by capturing an image of input devices 8 and 10 without hands 22 and normalizing the image.
3. The software application automatically adjusts a brightness and contrast of (live) video 11 so as to increase visual salience hands 22 and diminish a visual salience of input devices 8 and 10. Additionally, an infrared filter may be used. After an adjustment of the brightness and contrast of (live) video 11, only video image 22a of user's hands is displayed without video images 8a and 10a.
4. The software application super-imposes a live image 22a of hands 22 in a semi-transparent mode on top of images 8a and 10a so that the keys (or any other device on input devices 8 or 10) behind the fingers on hands 22 will faintly show through image 22a. For example, video 11 may comprise a ghost image of hands 22 hovering over a keyboard (i.e., input device 8).
5. The software application may generate a window for video 11 that may share a desktop space with an application (e.g., a word processing application) that is receiving keystrokes (e.g., positioned above a word processing window). Alternatively, the window for video 11 may be positioned to be always on top of the application and placed by the user away from an area where he/she is typing into the application that is receiving the keystrokes.
6. The software application may allow the window for video 11 to be shrunk down to an arbitrary size, thereby allowing a user to leave most of the primary application (e.g., a word processing application) unobscured. Additionally, the software application allows novice typists a larger video image to view while they "hunt and peck" for word.

Figure 3:
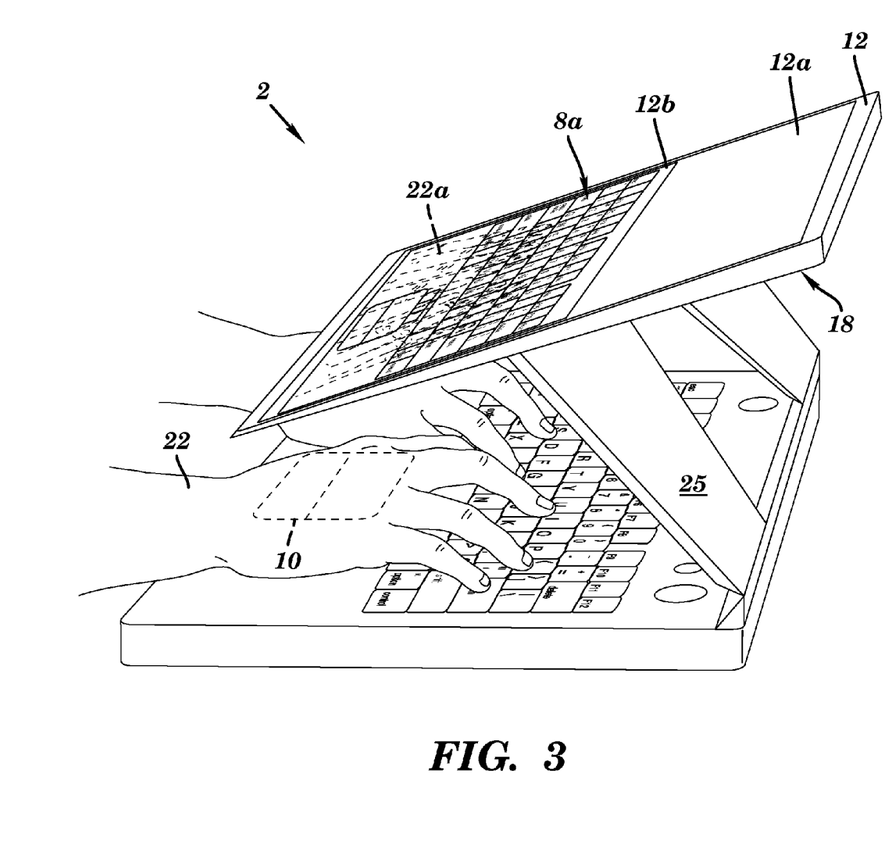
FIG. 3 illustrates a first alternative view of the computing apparatus of FIG. 2, in accordance with embodiments of the present invention.

FIG. 3 illustrates a first alternative view of computing apparatus 2 of FIG. 2, in accordance with embodiments of the present invention. The view in FIG. 3 illustrates a detailed view of hinges 25.

Figure 4:
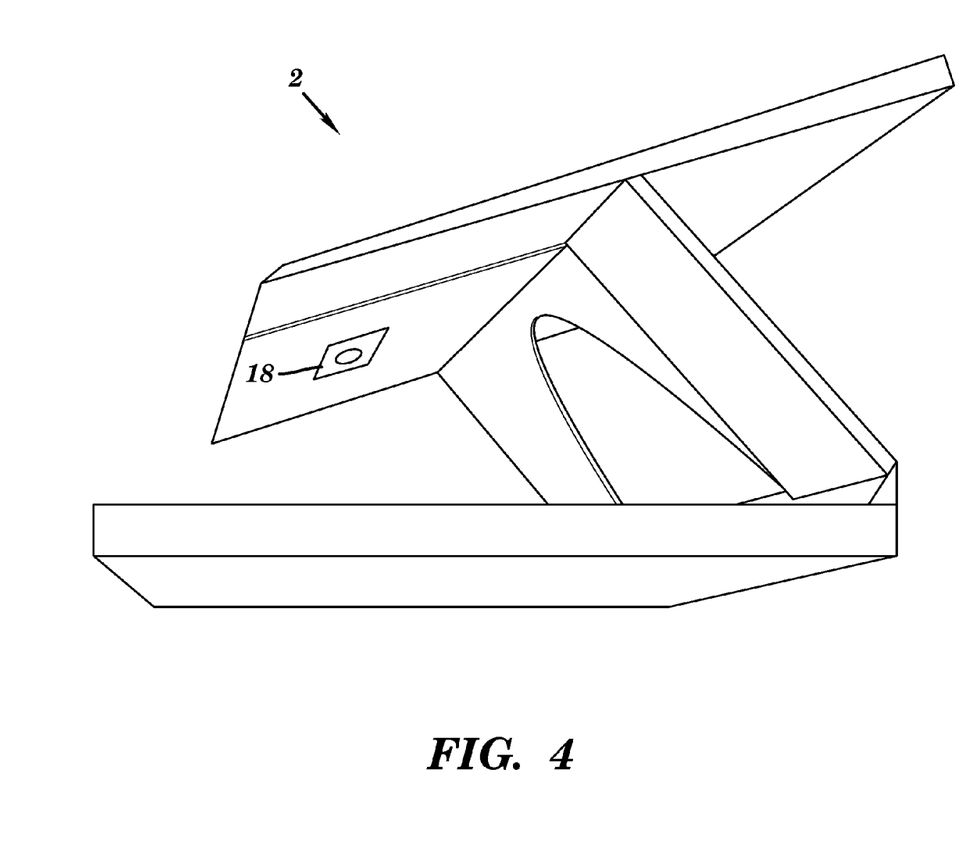
FIG. 4 illustrates an alternative view of the computing apparatus of FIG. 3, in accordance with embodiments of the present invention.

FIG. 4 illustrates an alternative view of computing apparatus 2 of FIG. 3, in accordance with embodiments of the present invention. The view in FIG. 4 illustrates a detailed view of recording device 18.

Figure 5:
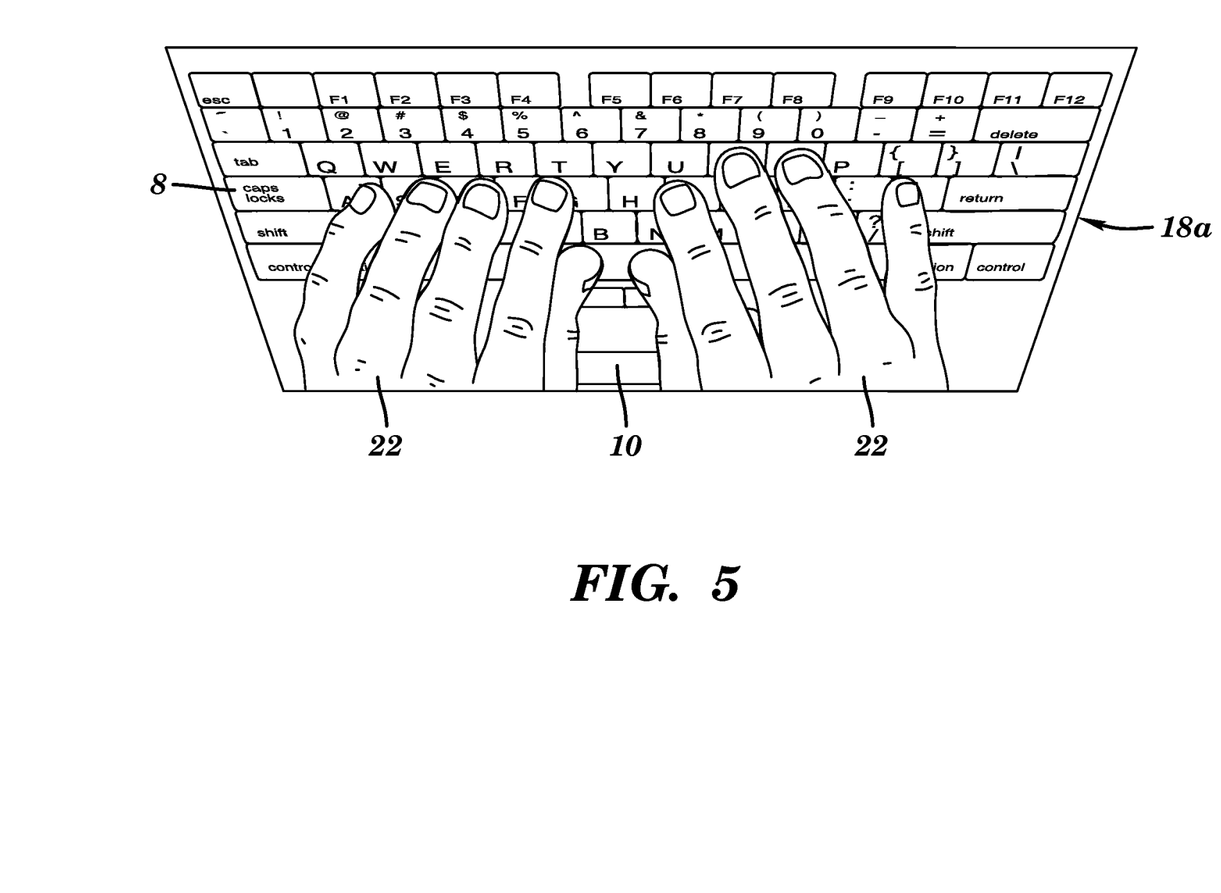
FIG. 5 illustrates a view from the recording device of FIG. 4, in accordance with embodiments of the present invention.

FIG. 5 illustrates a view 18a from recording device 18, in accordance with embodiments of the present invention. View 18a comprises a view of hands 22 activating input devices 8 and 10.

Figure 6:
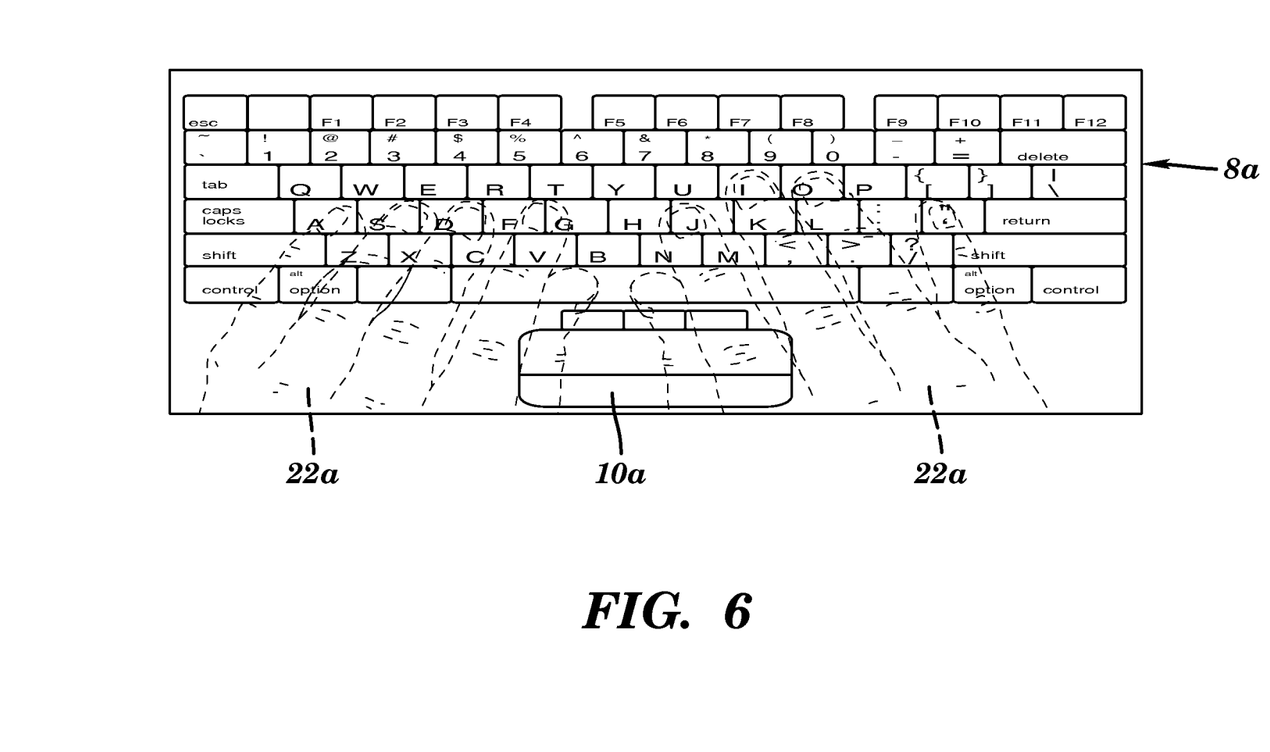
FIG. 6 illustrates an example of a video image, in accordance with embodiments of the present invention.

FIG. 6 illustrates an example of video 11, in accordance with embodiments of the present invention. Video 11 comprises a super-imposed a live image 22a of hands 22 in a semi-transparent mode on top of images 8a and 10a so that the keys (or any other device on input devices 8 or 10) behind the fingers on hands 22 faintly show through image 22a.

Figure 7:
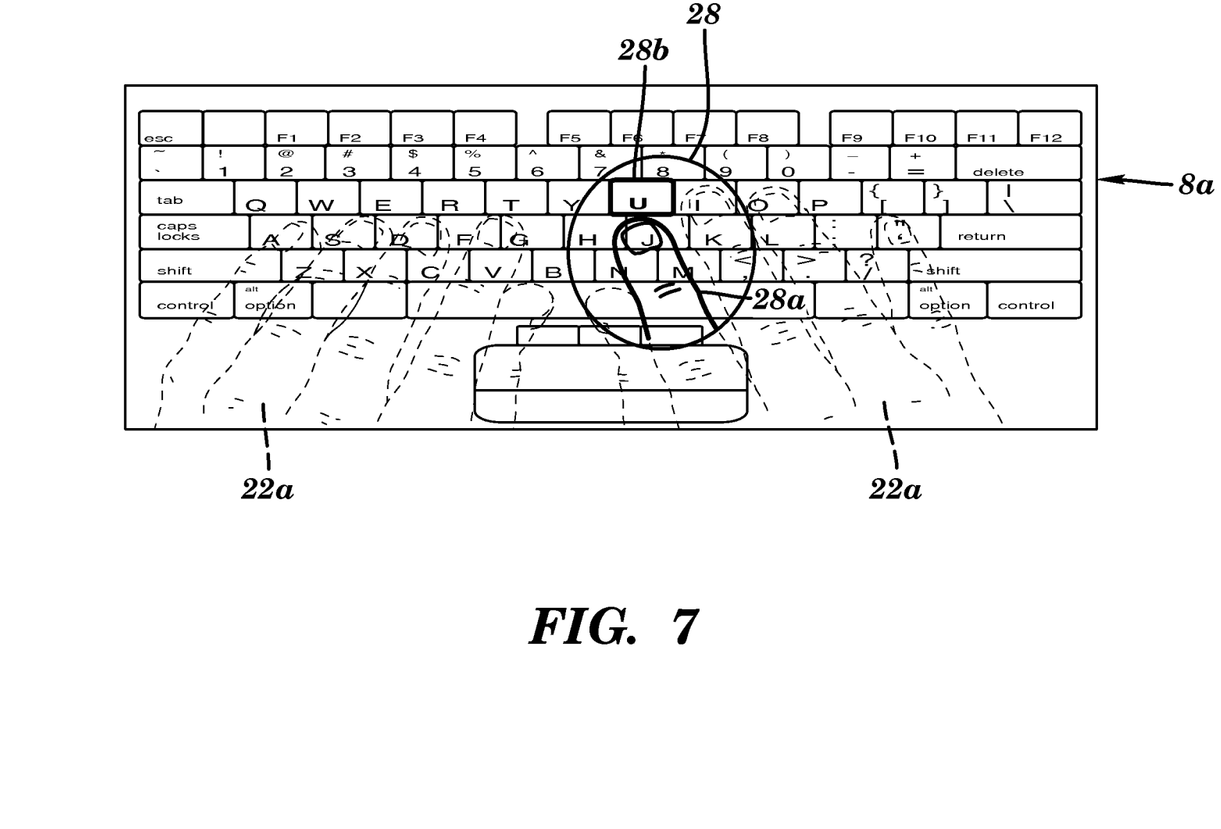
FIG. 7 illustrates an alternative video image to the video image of FIG. 6, in accordance with embodiments of the present invention.

FIG. 7 illustrates an alternative video 11a to video 11 of FIG. 6, in accordance with embodiments of the present invention. Video 11a additionally comprises highlights 28. Highlight 28 comprises a highlight 28a over a finger in image 22a and a highlight over a key in image 8a. Highlight 28 may be used as a typing aid. Highlight 28 may be moved to any portion of images 8a and 22a.

Figure 8:
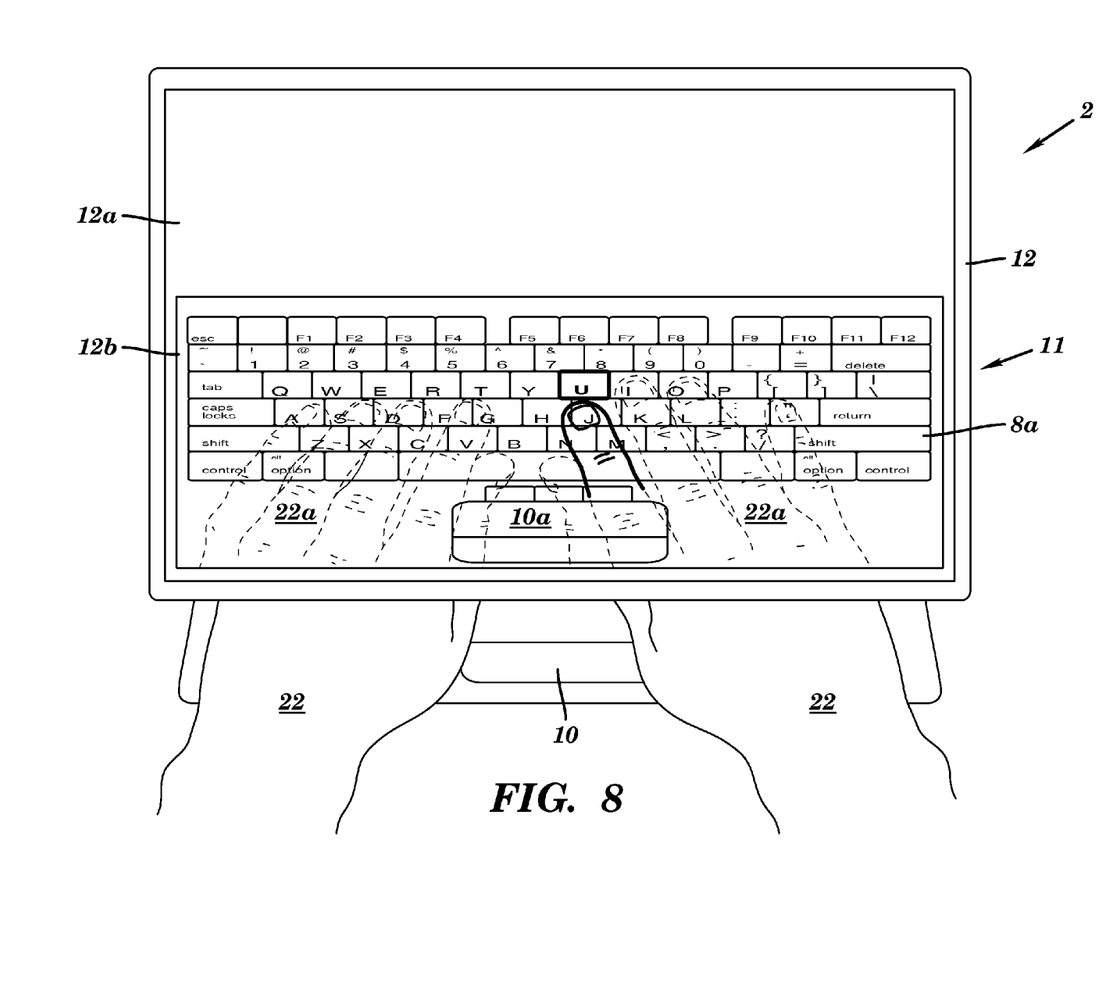
FIG. 8 illustrates a second alternative view of the computing apparatus of FIG. 2, in accordance with embodiments of the present invention.

FIG. 8 illustrates a second alternative view of computing apparatus 2 of FIG. 2, in accordance with embodiments of the present invention. The view in FIG. 8 illustrates a detailed view of portion 12b of display unit 12 comprising text generated from a word processor.

Figure 9:
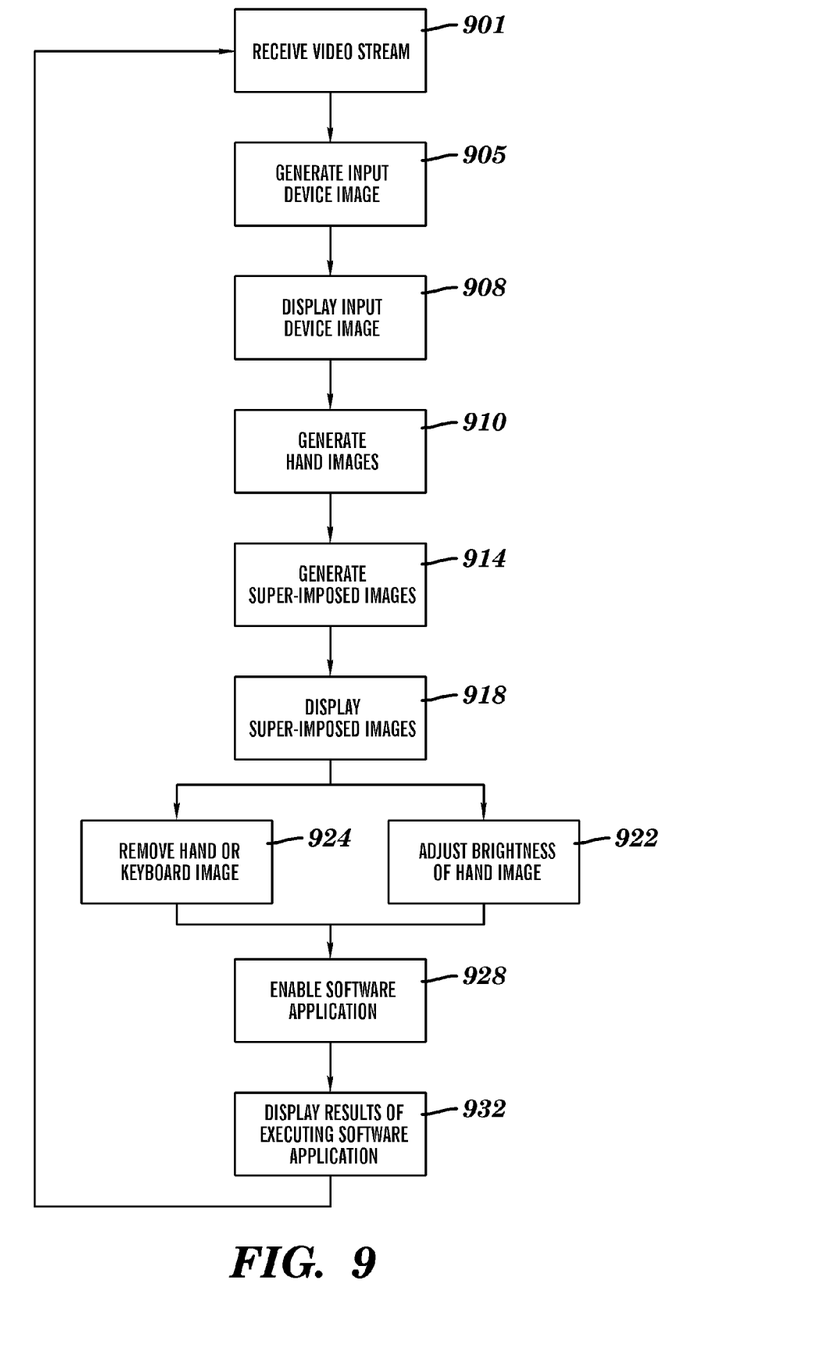
FIG. 9 illustrates a flowchart describing an algorithm used by the computing apparatus of FIGS. 1-8 for generating a video, in accordance with embodiments of the present invention.

FIG. 9 illustrates a flowchart describing an algorithm used by computing apparatus 2 of FIGS. 1-8 for generating video 11, in accordance with embodiments of the present invention. In step 901, a computing apparatus (e.g., computing apparatus 2 of FIGS. 1-8) receives a video data stream from a video recording device (e.g., recording device 18 of FIGS. 1-8) attached to a backside of a video monitor (e.g., display unit 12 of FIGS. 1-8) connected to the computing apparatus. The video data stream comprises:
1. A first video image of an input device(s) (e.g., input devices 8 and 10 of FIGS. 1-8) electrically connected to the computing apparatus.
2. A second video image of a user's hands (e.g., hands 22 of FIGS. 1-8) enabling switches (e.g., keys on a keyboard) on the input device(s).

In step 905, an input device image (e.g., image 8a or 10a of FIGS. 1-8) associated with the input device(s) is generated. The input device image may be generated by retrieving the input device image from a stored library of images or by retrieving the input device image from the first video image. In step 908, the input device image generated in step 905 is displayed via the video monitor. The input device image may illustrate various switches (e.g., keys on a keyboard, mouse pad buttons being activated, etc) being enabled by a user. The input device image may be displayed within a specified portion of the video monitor (i.e., not an entire portion of the video monitor). Alternatively (in a case where the video monitor comprises a plurality of display monitors), the input device image may be displayed one of the video monitors. In step 910, a hand image (e.g., image 22a of FIGS. 1-8) associated with a user's hands (e.g., hands 22 of FIGS. 1-8) is generated. The hand image may be generated by retrieving the hand device image from a stored library of hand images or by retrieving the hand image from the second video image. In step 914, a super imposed image is generated by super imposing the hand image generated in step 910 over the input device image generated in step 905. In step 918, the super imposed image is displayed via the video monitor. The super imposed image is displayed within a specified portion of the video monitor.

In steps 922 and 924, the superimposed image is modified in accordance with a user request. In step 922, the superimposed image is modified by adjusting a brightness and contrast of the super imposed image such that the input device image is visible through the hand image. In step 924, the superimposed image is modified by removing either the hand image or the input device image so that only one image is shown performing functions. In step 928, a software application (e.g., a word processor application) is enabled. In step 932, results from executing the software application (e.g., text) are displayed in a separate window and step 901 is repeated.

Figure 10:
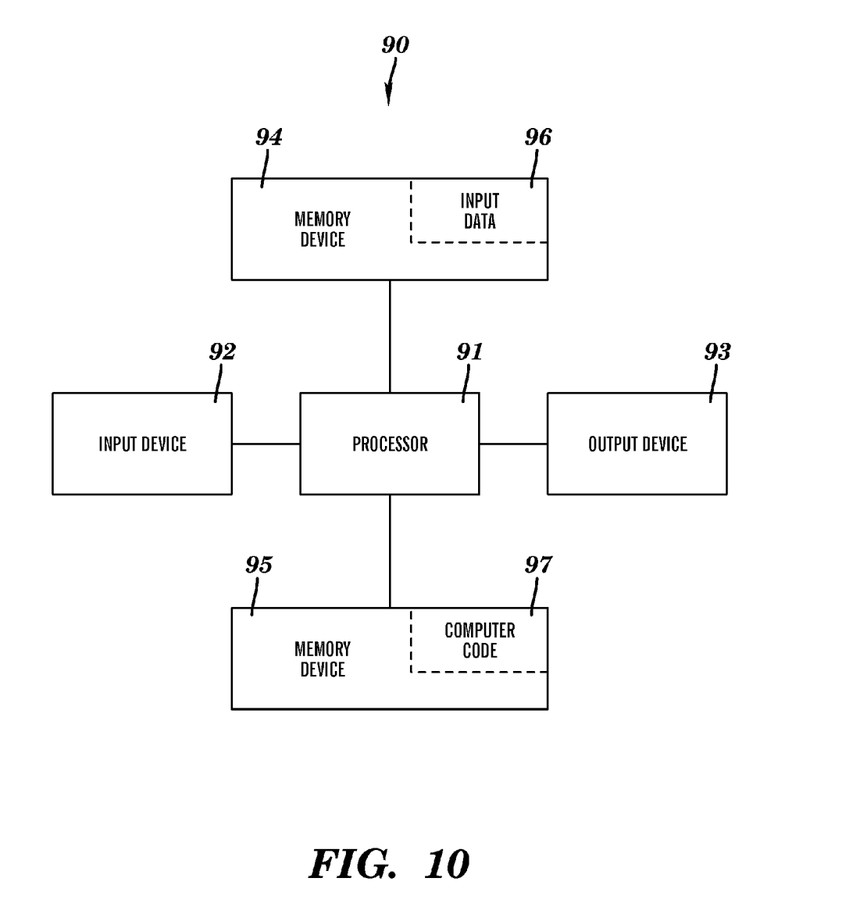
FIG. 10 illustrates a computer apparatus used for generating images from video data, in accordance with embodiments of the present invention.

FIG. 10 illustrates a computer apparatus 90 (e.g., computing apparatus 2 of FIGS. 1-8) used for generating images from video data, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 9) for generating images from video data. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 10) may comprise the algorithm of FIG. 9 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to for generate images from video data. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for generating images from video data. In another embodiment, the invention provides a business method that performs the process steps of the invention on a subscription, advertising, and/or fee basis. That is, a service provider, such as a Solution Integrator, could offer to perform a process for generating images from video data. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A method comprising:
  receiving, by a computing apparatus from a video recording device attached to a backside of a video monitor mechanically and electrically connected to said computing apparatus, a first video data stream, wherein said first video data stream comprises a first video image of an input device electrically connected to said computing apparatus and a second video image of a users hands enabling switches on said input device, wherein said first video image and said second video image comprise keystone adjustments to remove image distortion, wherein said video monitor is positioned over said input device such that said users hands are positioned between said backside of said video monitor and a topside of said input device, and wherein said users hands are obstructed from view by said video monitor;

displaying, by said computing apparatus via said video monitor, an input device image associated with said input device, wherein said input device image illustrates various switches being enabled, wherein said input device image is displayed within a first independent portion of said video monitor, and wherein said first independent portion does not include an entire portion of said video monitor;

super-imposing, by said computing apparatus, a hand image associated with said users hands over said input device image;

displaying, by said computing apparatus via said first independent portion of said video monitor, said hand image associated with said users hands, wherein said hand image is displayed over said input device image, wherein said hand image is displayed directly above and over said users hands, and wherein said hand image is displayed within said first independent portion of said video monitor;

adjusting, by said computing apparatus, a brightness of said hand image such that said input device image is visible through said hand image, wherein said adjusting results in said hand image being placed in a semi-transparent mode such that images of said switches of said input device image are faintly displayed through said hand image;

removing, by said computing apparatus from said video monitor, said input device image such that only said users hands are visible within said first independent portion of said video monitor;

enabling, by said computing apparatus, a software application associated with said input device;

displaying, by said computing apparatus via a second independent portion of said video monitor, characters generated by said software application in response to said users hands enabling said switches on said input device, wherein said first independent portion differs from said second independent portion;

generating, by said computing apparatus multiple highlighted portions of said hand image and a multiple highlighted portions of said input device;

displaying, by said computing apparatus via said first independent portion of said video monitor, each portion of said multiple highlighted portions of said hand image and each portion of said multiple portions of said highlighted portion of said input device as each said portion of said multiple portions of said highlighted portion of said input device is being enabled; and displaying, by said computing apparatus via a clear lens comprised by said video monitor, an additional independent input device being enabled, wherein said video monitor is positioned over said additional input device such that said users hands are additionally positioned between said backside of said clear lens and a topside of said additional input device, and wherein said additional input device comprises a mouse pad being enabled.

2. The method of claim 1, further comprising:
before said displaying said input device image, retrieving by said computing apparatus, said input device image from said first video image.

3. The method of claim 1, wherein said computing apparatus comprises a library of input device images comprising said input device image, and wherein said method further comprises:

before said displaying said input device image, associating by said computing apparatus, said first video image with said input device image; and retrieving, by said computing apparatus in response to said associating, said input device image from said library of input device images.

4. The method of claim 3, wherein said associating said first video image with said input device image is based on a model number/brand of said computing apparatus.

5. The method of claim 1, further comprising:
before said displaying said hand image, retrieving by said computing apparatus, said hand image from said second video image.

6. The method of claim 1, wherein said computing apparatus comprises a library of hand images comprising said hand image, and wherein said method further comprises:

before said displaying said hand image, associating by said computing apparatus, said second video image with said hand image; and retrieving, by said computing apparatus in response to said associating, said hand image from said library of hand images.

7. The method of claim 1, further comprising:
removing, by said computing apparatus, said hand image from said video monitor.

8. The method of claim 1, wherein said software application is a word processor software application, and wherein said characters comprise text.

9. The method of claim 1, wherein said input device comprises a device selected from the group consisting of a keyboard/keypad assembly, a mouse assembly, and a joystick assembly.

10. The method of claim 1, wherein said input device is comprised by said computing apparatus.

11. The method of claim 1, wherein said video monitor is comprised by said computing apparatus.

12. The method of claim 1, wherein said video monitor is connected to said computing apparatus using a cantilevered hinge.

13. The method of claim 1, wherein said video monitor comprises a first display device and a second display device independent from said first display device, and wherein said method further comprises:

displaying, by said computing apparatus via said second display device, said hand image over said input device image.

14. A process for supporting computer infrastructure, said process comprising providing at least one support service for at least one of creating, integrating, hosting, maintaining, and deploying computer-readable code in a computing system, wherein the code in combination with the computing apparatus is capable of performing the method of claim 1.

15. A computing apparatus comprising a processor coupled to a computer-readable memory unit, said memory unit comprising instructions that when executed by the processor implements an image generation method, said method comprising:

receiving, by said computing apparatus from a video recording device attached to a backside of a video monitor mechanically and electrically connected to said computing apparatus, a first video data stream, wherein said first video data stream comprises a first video image of an input device electrically connected to said computing apparatus and a second video image of a users hands enabling switches on said input device, wherein said first video image and said second video image comprise keystone adjustments to remove image distortion, wherein said video monitor is positioned over said input device such that said users hands are positioned between said backside of said video monitor and a topside of said input device, and wherein said users hands are obstructed from view by said video monitor;

displaying, by said computing apparatus via said video monitor, an input device image associated with said input device, wherein said input device image illustrates various switches being enabled, wherein said input device image is displayed within a first independent portion of said video monitor, and wherein said first independent portion does not include an entire portion of said video monitor;

super-imposing, by said computing apparatus, a hand image associated with said users hands over said input device image;

displaying, by said computing apparatus via said first independent portion of said video monitor, said hand image associated with said users hands, wherein said hand image is displayed over said input device image, wherein said hand image is displayed directly above and over said users hands, and wherein said hand image is displayed within said first independent portion of said video monitor;

adjusting, by said computing apparatus, a brightness of said hand image such that said input device image is visible through said hand image, wherein said adjusting results in said hand image being placed in a semi-transparent mode such that images of said switches of said input device image are faintly displayed through said hand image;

removing, by said computing apparatus from said video monitor, said input device image such that only said users hands are visible within said first independent portion of said video monitor;

enabling, by said computing apparatus, a software application associated with said input device;

displaying, by said computing apparatus via a second independent portion of said video monitor, characters generated by said software application in response to said users hands enabling said switches on said input device, wherein said first independent portion differs from said second independent portion;

generating, by said computing apparatus multiple highlighted portions of said hand image and a multiple highlighted portions of said input device;

displaying, by said computing apparatus via said first independent portion of said video monitor, each portion of said multiple highlighted portions of said hand image and each portion of said multiple portions of said highlighted portion of said input device as each said portion of said multiple portions of said highlighted portion of said input device is being enabled; and displaying, by said computing apparatus via a clear lens comprised by said video monitor, an additional independent input device being enabled, wherein said video monitor is positioned over said additional input device such that said users hands are additionally positioned between said backside of said clear lens and a topside of said additional input device, and wherein said additional input device comprises a mouse pad being enabled.

16. The computing apparatus of claim 15, wherein said method further comprises:
before said displaying said input device image, retrieving by said computing apparatus, said input device image from said first video image.

17. The computing apparatus of claim 15, wherein said computing apparatus comprises a library of input device images comprising said input device image, and wherein said method further comprises:
before said displaying said input device image, associating by said computing apparatus, said first video image with said input device image; and
retrieving, by said computing apparatus in response to said associating, said input device image from said library of input device images.

18. The computing apparatus of claim 17, wherein said associating said first video image with said input device image is based on a model number/brand of said computing apparatus.

19. The computing apparatus of claim 15, wherein said method further comprises:
before said displaying said hand image, retrieving by said computing apparatus, said hand image from said second video image.

20. A computer program product, comprising a computer readable storage medium having a computer readable program code embodied therein, said computer readable program code comprising an algorithm that when executed by a computer processor of a computing system implements an image generation method comprising:

receiving, by said computing apparatus from a video recording device attached to a backside of a video monitor mechanically and electrically connected to said computing apparatus, a first video data stream, wherein said first video data stream comprises a first video image of an input device electrically connected to said computing apparatus and a second video image of a users hands enabling switches on said input device, wherein said first video image and said second video image comprise keystone adjustments to remove image distortion, wherein said video monitor is positioned over said input device such that said users hands are positioned between said backside of said video monitor and a topside of said input device, and wherein said users hands are obstructed from view by said video monitor;

displaying, by said computing apparatus via said video monitor, an input device image associated with said input device, wherein said input device image illustrates various switches being enabled, wherein said input device image is displayed within a first independent portion of said video monitor, and wherein said first independent portion does not include an entire portion of said video monitor;

super-imposing, by said computing apparatus, a hand image associated with said users hands over said input device image;

displaying, by said computing apparatus via said first independent portion of said video monitor, said hand image associated with said users hands, wherein said hand image is displayed over said input device image, wherein said hand image is displayed directly above and over said users hands, and wherein said hand image is displayed within said first independent portion of said video monitor;

adjusting, by said computing apparatus, a brightness of said hand image such that said input device image is visible through said hand image, wherein said adjusting results in said hand image being placed in a semi-transparent mode such that images of said switches of said input device image are faintly displayed through said hand image;

removing, by said computing apparatus from said video monitor, said input device image such that only said users hands are visible within said first independent portion of said video monitor;

enabling, by said computing apparatus, a software application associated with said input device;

displaying, by said computing apparatus via a second independent portion of said video monitor, characters generated by said software application in response to said users hands enabling said switches on said input device, wherein said first independent portion differs from said second independent portion;

generating, by said computing apparatus multiple highlighted portions of said hand image and a multiple highlighted portions of said input device; and displaying, by said computing apparatus via said first independent portion of said video monitor, each portion of said multiple highlighted portions of said hand image and each portion of said multiple portions of said highlighted portion of said input device as each said portion of said multiple portions of said highlighted portion of said input device is being enabled;

displaying, by said computing apparatus via a clear lens comprised by said video monitor, an additional independent input device being enabled, wherein said video monitor is positioned over said additional input device such that said users hands are additionally positioned between said backside of said clear lens and a topside of said additional input device, and wherein said additional input device comprises a mouse pad being enabled.

* * * * *